(12) United States Patent
Mezzalira

(10) Patent No.: US 9,249,905 B2
(45) Date of Patent: Feb. 2, 2016

(54) INTEGRAL PIPE AND FITTING ASSEMBLY OF POLYMER MATERIAL, AND METHOD OF MAKING SAME

(71) Applicant: Alessandro Mezzalira, Ancignano di Sandrigo (IT)

(72) Inventor: Rinaldo Mezzalira, Ancignano di Sandrigo (IT)

( * ) Notice: Subject to any disclaimer, the term of this patent is extended or adjusted under 35 U.S.C. 154(b) by 69 days.

(21) Appl. No.: 13/736,560

(22) Filed: Jan. 8, 2013

(65) Prior Publication Data

US 2013/0118629 A1     May 16, 2013

Related U.S. Application Data

(63) Continuation of application No. 12/305,202, filed as application No. PCT/IB2007/051398 on Apr. 18, 2007, now abandoned.

(30) Foreign Application Priority Data

Jul. 7, 2006   (IT) ................................. VI2006A0213

(51) Int. Cl.
*F16L 13/02*       (2006.01)
*F16L 11/00*       (2006.01)
(Continued)

(52) U.S. Cl.
CPC ................. *F16L 11/00* (2013.01); *B29C 57/00* (2013.01); *B29C 65/02* (2013.01); *B29C 66/1162* (2013.01); *B29C 66/1222* (2013.01); *B29C 66/1224* (2013.01); *B29C 66/1282* (2013.01); *B29C 66/1286* (2013.01); *B29C 66/12441* (2013.01); *B29C 66/12463* (2013.01); *B29C 66/12469* (2013.01); *B29C 66/12821* (2013.01); *B29C 66/12841* (2013.01); *B29C 66/135* (2013.01); *B29C 66/5344* (2013.01); *B29C 66/723* (2013.01); *B29C 66/72141* (2013.01); *B29C 66/7392* (2013.01); *F16L 33/34* (2013.01); *F16L 47/02* (2013.01); *B29C 65/04* (2013.01); *B29C 65/0672* (2013.01); *B29C 66/71* (2013.01);
(Continued)

(58) Field of Classification Search
USPC .......... 285/222.3, 288.1, 21.2, 241, 242, 259, 285/222.2, 222.4; 156/73.5
See application file for complete search history.

(56) References Cited

U.S. PATENT DOCUMENTS 4,353,761 A * 10/1982 Woerz et al. ................. 156/73.5
4,932,689 A     6/1990 Bradley
(Continued)

FOREIGN PATENT DOCUMENTS

| DE | 4102700 | 8/1992 |
|---|---|---|
| DE | 19752806 | 6/1999 |
| DE | 202005004617 | 6/2005 |

*Primary Examiner* — David E Bochna
(74) *Attorney, Agent, or Firm* — Themis Law

(57) ABSTRACT

A hose and fitting assembly includes a hose of a first thermoplastic polymer material having an end portion with an inner surface and an outer surface and a fitting of a second polymer material for connection with an external point of use. The fitting has a central tubular projection with an axial fluid passageway. The central tubular projection has an inner wall which defines the fluid passageway and an outer wall, at least partly integrally coupled to the inner surface of the end portion of the hose. The hose and fitting assembly includes a reinforcement member of a third polymer material at the periphery of the end portion of the hose for restraining radial deformations of the hose and providing the assembly with a good mechanical and/or hydraulic sealing capability. A method of making such assembly.

13 Claims, 5 Drawing Sheets

(51) Int. Cl.
    *F16L 33/34* (2006.01)
    *F16L 47/02* (2006.01)
    *B29C 65/00* (2006.01)
    *B29C 57/00* (2006.01)
    *B29C 65/02* (2006.01)
    *B29C 65/06* (2006.01)
    *B29C 67/00* (2006.01)
    *B29L 9/00* (2006.01)
    *B29C 65/04* (2006.01)

(52) U.S. Cl.
    CPC ......... *B29C 66/929* (2013.01); *B29C 66/92431* (2013.01); *B29C 66/939* (2013.01); *B29C 66/93451* (2013.01); *B29C 66/949* (2013.01); *B29C 67/0018* (2013.01); *B29L 2009/00* (2013.01)

(56) References Cited

U.S. PATENT DOCUMENTS

| | | | |
|---|---|---|---|
| 6,102,442 | A | 8/2000 | Gretz |
| 6,199,916 | B1 | 3/2001 | Klinger |
| 6,733,047 | B1 * | 5/2004 | Stieler .......................... 285/21.1 |
| 6,902,208 | B1 * | 6/2005 | Mobley et al. ............. 285/222.4 |

* cited by examiner

INTEGRAL PIPE AND FITTING ASSEMBLY OF POLYMER MATERIAL, AND METHOD OF MAKING SAME

FIELD OF THE INVENTION

The present invention finds application in the field of flexible hoses, and particularly relates to an integral hose and fitting assembly of polymer material.

The invention further relates to a method of making such hose and fitting assembly.

BACKGROUND OF THE INVENTION

Hose and fitting assemblies are known, specifically in the field of household appliances, industrial applications and gardening, which comprise a flexible hose of a thermoplastic polymer material and a fitting, also made from a polymer material, which is integrally associated thereto. The fitting is designed for connection to an external point of use, such as a tap, for transfer of liquids and various fluids.

An example of these prior art assemblies is disclosed in European patent EP-B1-1108937 by the same Applicant.

One drawback of these prior art solutions is that they do not provide an adequate mechanical and/or hydraulic sealing capability of the assembly.

In terms of mechanical features, inner pressure and wear can cause radial expansions and deformations to various extents at the coupling until a "burst", i.e. mechanical failure thereof occurs.

Also, in terms of hydraulic features, fluid leakages and dripping may occur, thereby causing flooding and increasing costs.

These drawbacks become even more serious with material ageing and wear.

SUMMARY OF THE INVENTION

The object of this invention is to overcome the above drawbacks, by providing a hose and fitting assembly that is highly efficient and relatively cost-effective.

A particular object is to provide an assembly that provides a good mechanical and/or hydraulic seal between hose and fitting.

A further object is to provide a method for making an assembly, which maximizes productivity and minimizes scrap parts.

These and other objects, as better explained hereafter, are fulfilled by a hose and fitting assembly, which comprises: a hose of a first thermoplastic polymer material having an end portion with an inner surface and an outer surface and a fitting of a second polymer material for connection with an external point of use. The fitting has a central tubular projection with an axial fluid passageway. The central tubular projection has an inner wall which defines the fluid passageway and an outer wall, at least partly integrally coupled to the inner surface of the end portion of the hose.

According to the invention, the assembly comprises reinforcement means of a third polymer material at the periphery of the end portion of the hose.

Thanks to this particular configuration, the assembly of the invention has an excellent mechanical and/or hydraulic sealing capability.

The provision of reinforcement means at the periphery of the end portion of the hose restrains radial deformations of the hose and provides improved mechanical and/or hydraulic sealing capability as compared with prior art hose assemblies.

As used herein, the term "at least partly integrally coupled" and derivatives thereof, has the meaning of an either total or partial integral coupling, such integral coupling involving the whole or a part of the longitudinal extension of the surfaces and/or walls and/or faces and/or portions of interest.

In a further aspect, the invention relates to a method for making such hose and fitting assembly, which comprises the steps of: providing a hose of a first thermoplastic polymer material having an end portion with an inner surface and an outer surface; providing a fitting of a second polymer material for connection to an external point of use, said fitting comprising a central tubular projection with an axial fluid passageway, said central tubular projection having an inner wall which defines the fluid passageway and an outer wall designed to be coupled to the inner surface of the end portion of the hose; securing the fitting to the hose by at least partial integral coupling of the outer wall of the tubular projection to the inner surface of the end portion; providing reinforcement means of a third polymer material designed to be placed at the periphery of the end portion of the hose; placing the reinforcement means at the periphery of the end portion of the hose for restraining radial deformations of the hose and ensure integrity of the assembly.

Advantageous configurations of the assembly and method of the invention are defined in accordance with the dependent claims.

BRIEF DESCRIPTION OF THE DRAWINGS

Further features and advantages of the invention will be more apparent upon reading the detailed description of a preferred, non-exclusive embodiment of a hose assembly according to the invention, which is described as a non-limiting example with the help of the annexed drawings, in which.

DETAILED DESCRIPTION OF A PREFERRED EMBODIMENT

Figure 1:
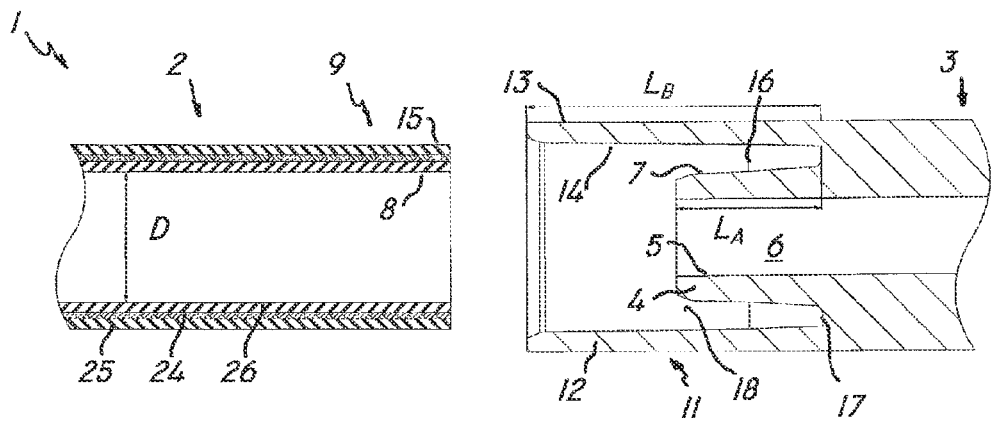
FIGS. 1 and 2 are side views of a first embodiment of the assembly of the invention.

Referring to the above figures, the hose/fitting assembly of the invention, overall designated with numeral 1, essentially comprises a hose 2 of a first thermoplastic polymer material, integrally coupled to a fitting 3 of a second polymer material, for connection to an external point of use, not shown but well known per se.

The fitting 3 comprises a central tubular projection 4 having an inner wall 5 which defines an axial fluid passageway 6 and an outer wall 7, integrally coupled to the inner surface 8 of an end portion 9 of the pipe 2.

Integral coupling between the outer wall 7 and the inner surface 8 may be obtained by means of various techniques such as, by way of non limiting example, rotational friction welding, radio frequency welding or the like.

The hose and fitting assembly 1 may comprise reinforcement means of a third polymer material, generally designated by numeral 11, located at the periphery of the end portion 9 of the hose 2 for restraining radial deformations of the hose and providing the assembly with a good mechanical and/or hydraulic sealing capability.

The first polymer material and/or the second polymer material and/or the third polymer material may be selected from the group comprising PVC, PU, EVA, PE, PP, PBT, PET, PA, PMMA, of either the homopolymer or copolymer type, natural or synthetic rubbers or a combination thereof.

Advantageously, the first polymer material of the hose 2 may be compatible with the second polymer material of the fitting 3 and/or the third polymer material of the reinforcement means 11.

As used herein, the term "compatible materials" and derivatives thereof, are meant to indicate two materials that can be integrally coupled while maintaining the properties of their physico-chemical bond unaltered with time.

Conveniently, the second polymer material of the fitting 3 and/or the third polymer material of the reinforcement means 11 mat have a higher stiffness than the first polymer material of the hose 2, to allow coupling therebetween by at least partial melting of the surface layers of the relevant surfaces such as, without limitation, by rotational friction welding.

In a preferred non exclusive embodiment of the invention, the first polymer material of the hose 2 may be of the same nature as the second polymer material of the fitting 3 and/or as the third polymer material of the reinforcement means 11, such as PVC.

It shall be understood that the reinforcement means may be situated in any position at the periphery of the end portion 9 of the hose 2 and may be arranged in any manner without departure from the scope of projection as defined by the annexed claims.

Advantageously, the reinforcement means 11 may include an annular member 12 of a third polymer material, having an outer face 13 and an inner face 14 susceptible of being coupled to the outer surface 15 of the end portion 9 of the hose 2.

The third polymer material of the annular member 12 may be stiffer than the first polymer material, and may be of the same nature as the second polymer material of the fitting 3.

Furthermore, the third polymer material may advantageously be substantially as stiff as the second polymer material.

In a preferred, non exclusive embodiment of the invention, the ratio between the length of the tubular projection 4 and the inside diameter $D_I$ of the hose 2 may be in a range from about 1:2 to about 8:1, and preferably of nearly 2:1. The ratio between the length $L_B$ of the annular member 12 and the inside diameter $D_I$ of said hose is in a range from about 1:1 to about 12:1, and may preferably be of about 4:1.

Also, the ratio between the length $L_B$ of the annular member 12 and the length $L_A$ of the tubular projection 4 may be suitably in a range from about 1:1 to about 4:1, and may preferably be of about 2:1.

Such sizing arrangement of the tubular projection 4 and/or the annular member 12 provides an improved mechanical and/or hydraulic sealing capability of the assembly.

Advantageously, the outer wall 7 of the tubular projection 4 may be inwardly tapered for easier connection with the inner surface 8 of the end portion 9 of the hose 2. On the other hand, the inner face 14 of the annular member 12 may be outwardly tapered for easier connection with the outer surface 15 of the same end portion 9.

Figure 2:
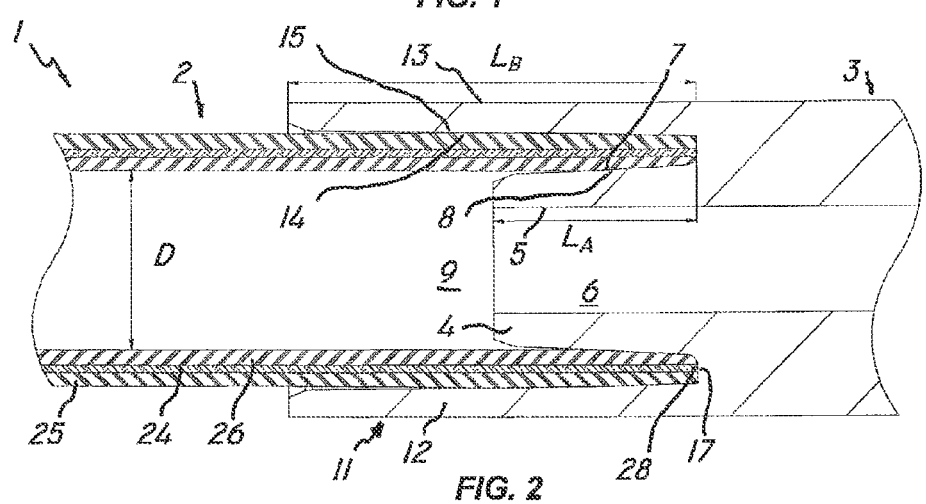

In a first embodiment, as shown in FIGS. 1 and 2, the annular member 12 may be integral with the fitting 3, i.e. formed of one piece therewith. The annular member 12 may be coaxial with the tubular projection 4 and radially spaced therefrom to define an interspace 16 having a bottom wall 17 and an opening 18, particularly shown in FIG. 1, designed to receive the end portion 9 of the hose 2. In this case, the third polymer material is apparently identical to the second polymer material.

The final operating configuration of this embodiment is shown in FIG. 2, wherein the outer surface 15 of the end portion 9 of the hose 2 is integrally coupled to the inner face 14 of the annular member 12, whereas the outer wall 7 of the projection 4 is integrally coupled to the inner surface 8 of the end portion 9 of the hose 2. Furthermore, in this position, the end portion 9 of the hose 2 is integrally coupled to the bottom wall 17 of the interspace 16, for example at an end area 28 thereof.

It shall be understood that the term "final operating configuration" and derivatives thereof, as used herein, are meant to indicate the configuration of an object during its normal operation.

Figure 3:
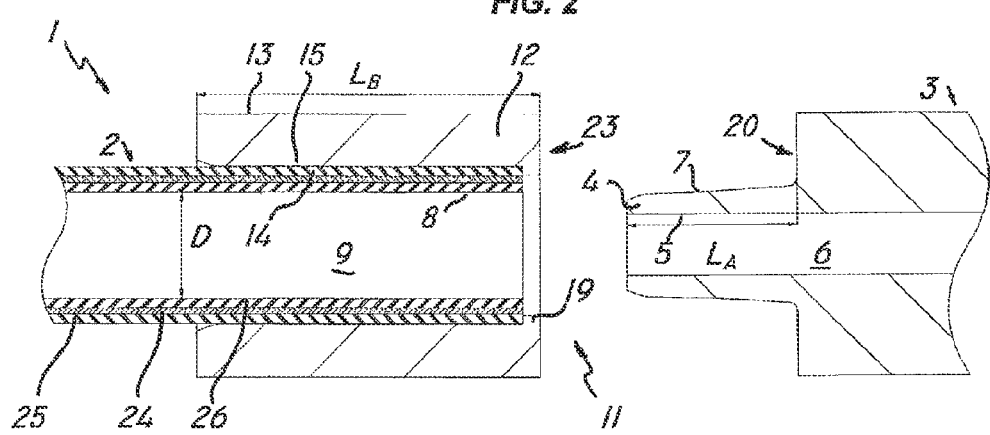
FIGS. 3 and 4 are side views of another embodiment of the assembly of the invention.
Figure 4:
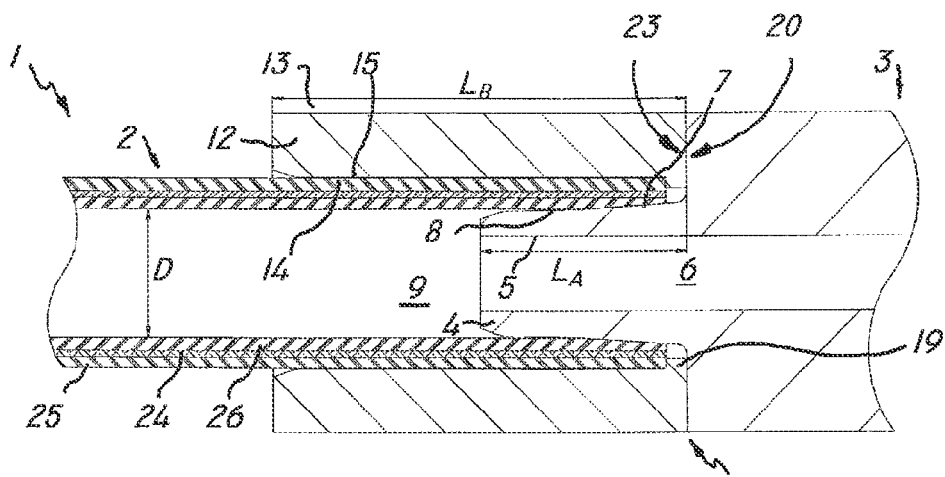

In a further embodiment of the invention, as shown in FIGS. 3 and 4, the annular member 12 may be separate from the fitting 3, and be fitted onto the hose 2 at the end portion 9.

FIG. 4 shows the final operating configuration of this embodiment, in which the outer surface 15 of the end portion 9 of the hose 2 is integrally coupled to the inner face 14 of the annular member 12, and the outer wall 7 of the projection 4 is integrally coupled to the inner surface 8 of the end portion 9 of the hose 2. Furthermore, the annular member 12 interacts with the fitting 3 by a radial projection 19 which abuts, in operation, against the area 20 of the fitting 3 at the periphery of the central tubular projection 4.

Furthermore, advantageously, the reinforcement means 11 may also include an expanded area 21 of the end portion 9 of the hose 2, which may have a thickness $s_1$ greater than the thickness $s_2$ of the hose 2.

Figure 9:
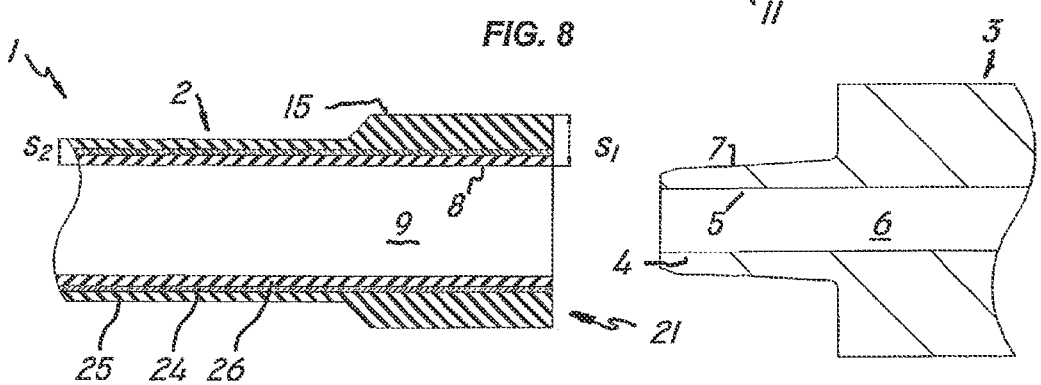
FIGS. 9, 10 and 11 are side views of a further embodiment of the assembly of the invention.
Figure 10:
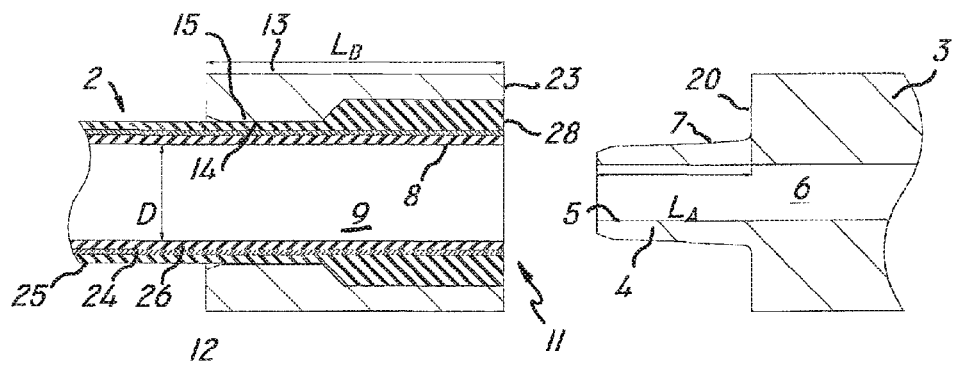
Figure 11:
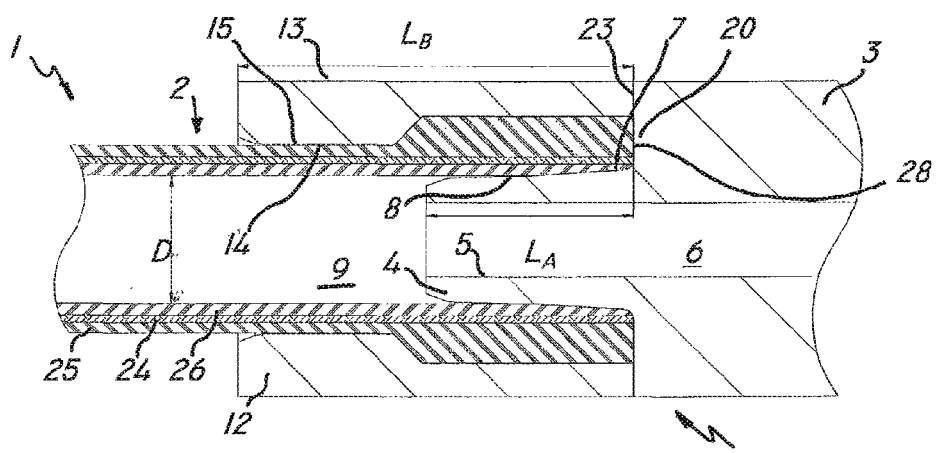
Figure 12:
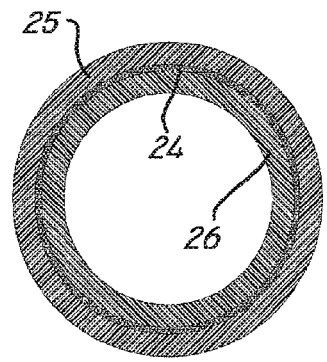
FIG. 12 is a sectional view of one embodiment of the hose forming part of the assembly of the invention.

FIGS. 9, 10 and 11 show by way of example and without limitation, an embodiment of the invention in which the reinforcement means 11 may include, besides the annular member 12, the expanded area 21 formed by enlargement of the end portion 9 of the hose 2.

In this embodiment, both the annular member and the expanded area 21 act in synergy to restrain radial deformations of the hose and to provide the assembly with a good mechanical and/or hydraulic sealing capability.

FIG. 11 shows the final operating configuration of this embodiment, in which the outer surface 15 of the end portion 9 of the hose 2 is integrally coupled to the inner face 14 of the annular member 12, whereas the outer wall 7 of the projection 4 is integrally coupled to the inner surface 8 of the end portion 9 of the hose 2. Furthermore, in this position, the end portion 9 of the hose 2 may be integrally coupled to the area 20 of the fitting 3 at the periphery of the tubular projection 4 by its end area 28. The annular member 12 may further be integrally coupled to the area 20 a head portion 23 thereof.

FIGS. 5, 6, 7 and 8 show another embodiment of the invention, wherein the expanded area 21 may be defined by two adjacent overlapping hose sections 22, 22'. In this embodiment, the reinforcement means 11 may include both the expanded area 21 formed by the overlapped sections 22, 22' and the annular member 12 at the periphery of the outer surface 15 of the end portion 9 of the hose 2. In this embodiment, both the expanded area 21 formed by the overlapped sections 22, 22' and the annular member 12 act in synergy to restrain radial deformations of the hose and to provide the assembly with a good mechanical and/or hydraulic sealing capability.

It shall be understood that the expanded area 21 may be defined either entirely or partially by two or more overlapped hose sections, and that such overlapping area may cover such sections either entirely or partially, without departure from the scope of protection as defined by the annexed claims.

Figure 5:
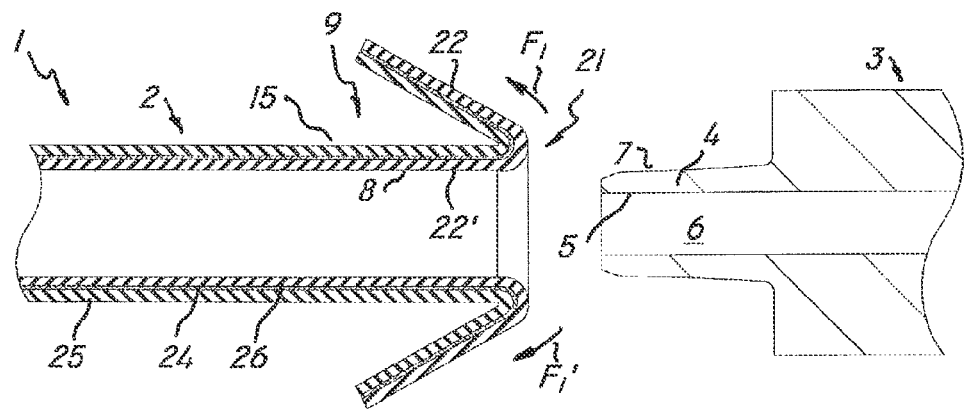
FIGS. 5, 6, 7 and 8 are side views of yet another embodiment of the assembly of the invention.
Figure 6:
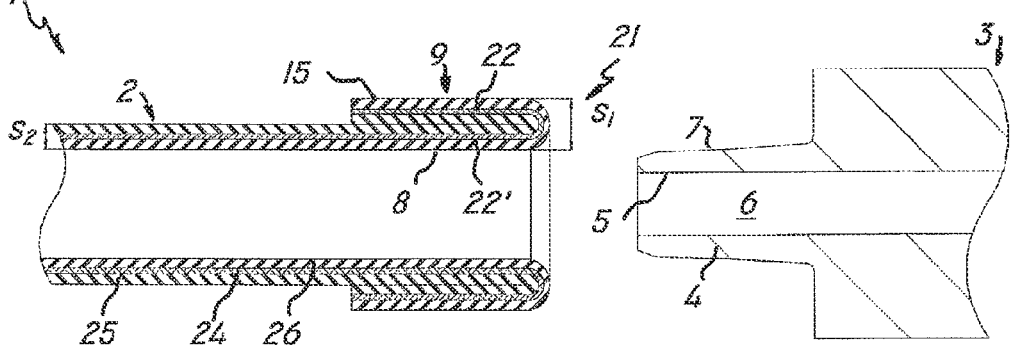
Figure 7:
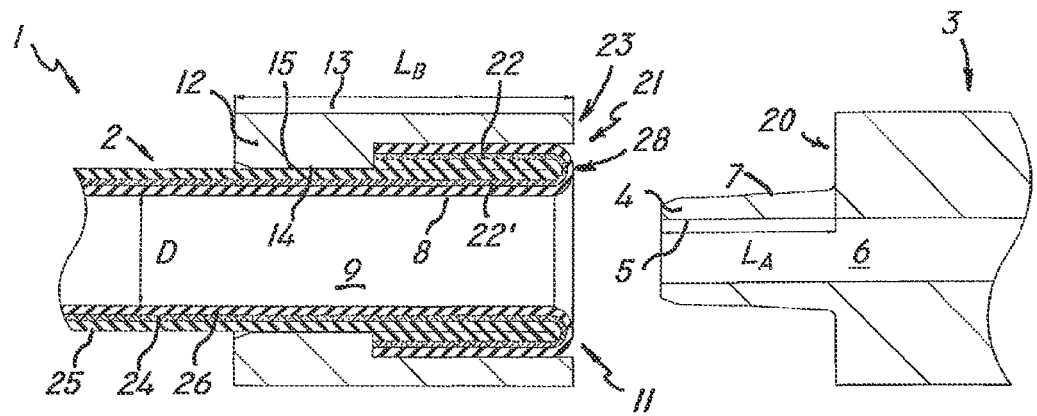

FIG. 5 shows an intermediate step of the overlapping process for forming the expanded area 21, in which the section 22' of the end portion 9 of the hose 2 is outwardly folded onto the section 22, in the direction of arrows $F_1$, $F_1$. For this purpose, the end portion 9 may be heated, e.g. in a hot water bath.

Figure 8:
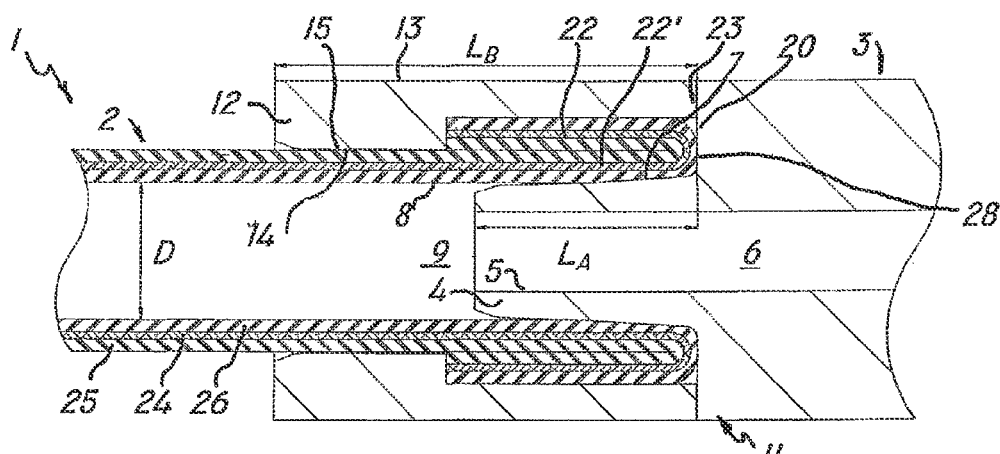

FIG. 8 shows the final operating configuration of this embodiment, in which the outer surface 15 of the end portion 9 of the hose 2 may be integrally coupled to the inner face 14 of the annular member 12, whereas the outer wall 7 of the projection 4 is integrally coupled to the inner surface 8 of the end portion 9 of the hose 2. Furthermore, in this position, the end portion 9 of the hose 2 may be integrally coupled to the area 20 of the fitting 3 at the periphery of the tubular projection 4 by its end area 28. The annular member 12 may further be integrally coupled to the area 20 by an end portion 23 thereof.

Conveniently, the reinforcement means 11 may further include a fibrous reinforcement layer 24 in the hose 2 between an outer protective layer 25 and an inner layer 26 designed to contact the fluid to be carried. The reinforcement layer 24 may be made from natural or synthetic fibers, whereas the outer layer 25 and the inner layer 26 may be made from the first polymer material, such as PVC.

Advantageously, the fibrous reinforcement layer 24 may have a braided, spiral wrapped, knitted, taped or mesh form with simple or double chain stitches, and be formed in accordance with the teachings of patents EP-B1-0623776 or EP-B1-0960297, by the same Applicant.

Figure 13:
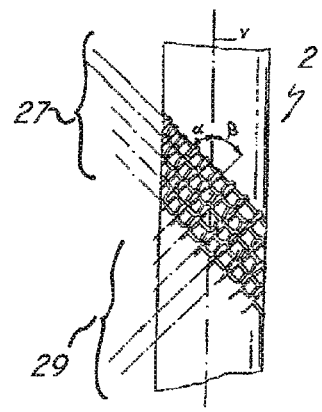
FIG. 13 is a side view of certain details of the hose of FIG. 12.

Also, conveniently, the chain-mesh fibrous layer 24 may have substantially parallel lines of stitches 27 and substantially parallel rows of stitches 29, as shown in FIG. 13.

To prevent axial twisting of the hose 2, the lines 27 and the rows 29 of stitches may be mutually inclined with respect to the longitudinal axis Y of the hose 2, at respective predetermined angles $\alpha$, $\beta$. Preferably, but without limitation, these angles $\alpha$, $\beta$ may be substantially equal.

In this embodiment, the fibrous reinforcement layer 24 will provide a synergic effect on the other reinforcement means 11 to restrain radial deformations of the hose 2 and to provide the assembly with a good mechanical and/or hydraulic sealing capability. Particularly, as shown in FIGS. 1 to 13, it can act synergistically with the annular member 12, whether the latter is integral with the fitting 3 or not, as particularly shown in the final operating configurations of FIG. 2 and FIG. 4, and also with the expanded area 21, as shown in the final operating configurations of FIG. 8 and FIG. 11.

Figure 14:
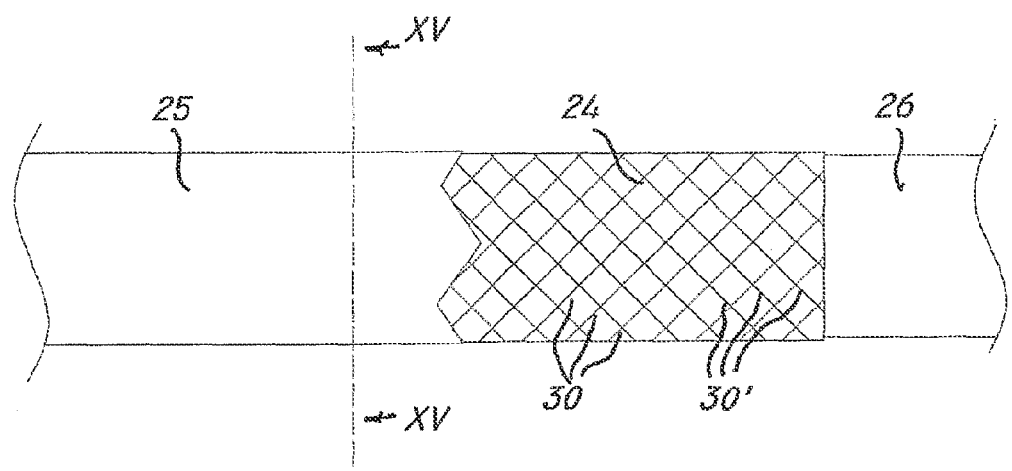
FIG. 14 is a side view of another embodiment of the hose forming part of the assembly of the invention.
Figure 15:
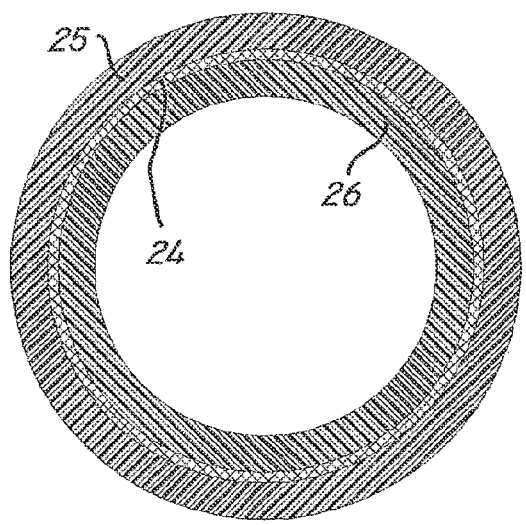
FIG. 15 is a view of the hose of FIG. 14, fragmented along a XV-XV plane.

In yet another embodiment, as shown in FIGS. 14 and 15, the hose forming part of the assembly according to the invention may be of the well-known "braided" type, i.e. having two overlapped rows of fibrous material. The two rows 30, 30' are wound in opposite directions to form a network, as shown in FIG. 14.

A method of making a hose and fitting assembly 1 will include the following steps.

The first steps consist in providing the hose 2, the fitting 3 and the reinforcement means 11.

As used herein, the term "provision" and derivatives thereof, have the meaning of preparation of a relevant component for a relevant process step, thereby including any preventive treatment designed for optimal performance of such relevant step, such as, without limitation, collection from a storage site, forming the component or any thermal and/or chemical and/or physical pre-treatments or the like.

Once the fitting 3 and the hose 2 are provided, there is the step of mutually fixing them by integral coupling of the outer wall 7 of the tubular projection to the inner surface 8 of the end portion 9 of the hose 2, which may be obtained, for example, by rotational friction welding.

Finally, there is the step of placing the reinforcement means 11 at the periphery of the end portion 9 of the hose 2 to restrain radial deformations of the hose and ensure integrity of the assembly.

It shall be understood that the steps may even not follow the above sequence, without departure from the scope of protection as defined in the annexed claims. By way of non limiting example, the step of fixing the fitting 3 to the hose 2 may precede the step of providing the reinforcement means 11.

If the fitting 3 is fixed to the hose 2 by rotational friction welding, the relative rotation speed and the compressive force exerted on the end portion 9 of the hose 2 and the fitting 3 may be set to allow the contact area to melt in 3 to 10 seconds, preferably in about 5 seconds.

Advantageously, the rotation speed may be of 50 to 3000 rpm and preferably of about 1000 rpm, whereas the compressive force between the portion 9 and the fitting 3 may be substantially constant and in a range from 3 N to 300 N, preferably of about 30 N.

From the foregoing it clearly appears that the hose/fitting assembly of the invention fulfills the intended objects and particularly to provide an assembly that exhibits a good mechanical and/or hydraulic sealing capability between hose and fitting.

The provision of the reinforcement means 11 of polymer material at the periphery of the end portion 9 of the hose 2 restrains radial deformations of the hose and provides a good mechanical and/or hydraulic sealing capability of the assembly.

The hose/fitting assembly of this invention is susceptible of a number of modifications and changes, all falling within the inventive concept disclosed in the appended claims. All the details thereof may be replaced by other technically equivalent parts, and the materials may vary depending on different needs, without departure from the scope of the invention.

While the hose/fitting assembly has been described with particular reference to the accompanying figures, the numerals referred to in the disclosure and claims are only used for the sake of a better intelligibility of the invention and shall not be intended to limit the claimed scope in any manner.

The invention claimed is:

1. An integral hose/connector assembly of a polymer material comprising:
    a flexible hose (2) of a first thermoplastic polymer material having an end portion (9) with an inner surface (8) and an outer surface (15), said flexible hose having at least one outer protective layer and at least one inner layer;
    a connector (3) of a second polymer material for connection with an external point of use, said connector (3) having a central tubular projection (4) with an axial fluid passageway (6), wherein said central tubular projection (4) has an inner wall (5) which defines said fluid passageway (6) and an outer wall (7), at least partly integrally coupled to the inner surface (8) of said end portion (9) of said hose (2); and reinforcement means (11) of a third polymer material at a periphery of said end portion (9) of said hose (2) for restraining radial deformations of the hose and providing the assembly with one or both of a desired mechanical or hydraulic sealing capability, said reinforcement means (11) including an annular member (12), having an outer face (13) and an inner face (14) designed to be coupled to said outer surface (15) of said end portion (9) of said hose (2), wherein a ratio between a length ($L_B$) of said annular member (12) and a length ($L_A$) of said tubular projection (4) is between 1:1 and 4:1, wherein said reinforcement means (11) further include a fibrous reinforcement layer (24) in said hose (2) between said at least one outer protective layer (25) and said at least one inner layer (26) designed to contact the fluid to be carried, wherein said outer wall (7) of said tubular projection (4) is inwardly tapered for easier connection with the inner surface (8) of said end portion (9) of said hose (2), and said inner face (14) of said annular member (12) is outwardly tapered for easier connection with said outer surface (15) of said end portion (9) of said hose (2), wherein said annular member (12) is coaxial with said central tubular projection (4) and radially spaced therefrom to define an interspace (16) having a bottom wall (17) and an opening (18), designed to receive said end portion (9) of said hose (2), wherein said end portion (9) of said hose (2) is at least partly integrally coupled to the bottom wall (17) of said interspace (16), wherein the bottom wall of said interspace and the inner face of said annular member are smooth and free of projections and recesses, and wherein said second polymer material and said third polymer material are stiffer than said first polymer material so that, upon fixing, the flexible hose melts to cause the outer wall of said central tubular projection to be integrally coupled to the inner surface of said end portion of said flexible hose and the end portion of said hose to be integrally coupled to the bottom wall of said interspace, and said outer surface of said end portion of said hose to be integrally coupled to said inner face of said annular member.

2. The assembly as claimed in claim 1, wherein said outer wall (7) and said inner surface (8) are integrally coupled by rotational friction welding.

3. The assembly as claimed in claim 1, wherein said outer surface (15) of said end portion (9) of said hose (2) is at least partly integrally coupled to said inner face (14) of said annular member (12).

4. The assembly as claimed in claim 1, wherein said annular member (12) is integral with said connector (3).

5. The assembly as claimed in claim 1, wherein said reinforcement means (11) further include an expanded area (21) of said end portion (9) of said hose (2).

6. The assembly as claimed in claim 1, wherein said first polymer material is compatible with one or both of said second polymer material or said third polymer material.

7. The assembly as claimed in claim 1, wherein one or both of said second polymer material or said third polymer material are stiffer than said first polymer material.

8. The assembly as claimed in claim 1, wherein said first polymer material is of a same nature as one or both of said second polymer material or said third polymer material.

9. The assembly as claimed in claim 1, wherein said third polymer material is identical to said second polymer material.

10. The assembly as claimed in claim 1, wherein a ratio between a length ($L_A$) of said tubular projection (4) and an inside diameter ($D_i$) of said hose (2) is in a range from about 0.5 to about 8.

11. The assembly as claimed in claim 1, wherein a ratio between a length ($L_B$) of said annular member (12) and an inside diameter ($D_i$) of said hose (2) is in a range from about 1 to about 12.

12. An integral hose/connector assembly of a polymer material comprising:
   a hose (2) of a first thermoplastic polymer material having an end portion (9) with an inner surface (8) and an outer surface (15), said flexible hose having at least one outer protective layer and at least one inner layer;
   a connector (3) of a second polymer material for connection with an external point of use, said connector (3) having a central tubular projection (4) with an axial fluid passageway (6), wherein said central tubular projection (4) has an inner wall (5) which defines said fluid passageway (6) and an outer wall (7), at least partly integrally coupled to the inner surface (8) of said end portion (9) of said hose (2); and
   reinforcement means (11) of a third polymer material at a periphery of said end portion (9) of said hose (2) for restraining radial deformations of the hose and providing the assembly with one or both of a desired mechanical or hydraulic sealing capability, said reinforcement means (11) including an annular member (12), having an outer face (13) and an inner face (14) designed to be coupled to said outer surface (15) of said end portion (9) of said hose (2),
   wherein said reinforcement means (11) further include a fibrous reinforcement layer (24) in said hose (2) between said at least one outer protective layer (25) and said at least one inner layer (26),
   wherein said outer wall (7) of said tubular projection (4) is inwardly tapered for easier connection with the inner surface (8) of said end portion (9) of said hose (2),
   wherein said reinforcement means (11) further include an expanded area (21) of said end portion (9) of said hose (2), and
   wherein said expanded area (21) is at least partly defined by two or more at least partly overlapping hose sections (22, 22').

13. A method of making an integral hose/connector assembly as claimed in claim 1, comprising the steps of:
   providing a flexible hose (2) of a first thermoplastic polymer material having an end portion (9) with an inner surface (8) and an outer surface (15);
   providing a connector (3) of a second polymer material for connection with an external point of use, said connector having a central tubular projection (4) with an axial fluid passageway (6), wherein said central tubular projection (4) has an inner wall (5) which defines said fluid passageway (6) and an outer wall (7), to be coupled to the inner surface (8) of said end portion (9) of said hose (2);
   fixing said connector (3) to said hose (2) by at least partial integral coupling of said outer wall (7) of said tubular projection (4) to said inner surface (8) of said end portion (9) of said hose (2);
   providing reinforcement means (11) of a third polymer material to be placed at a periphery of said end portion (9) of said hose (2); and
   placing said reinforcement means (11) at the periphery of said end portion (9) of said hose (2) to restrain radial deformations of the hose and ensure integrity of the assembly, wherein said reinforcement means (11) include an annular member (12), having an outer face (13) and an inner face (14) coupled to said outer surface (15) of said end portion (9) of said hose (2), wherein said integral coupling step is carried out by rotational friction welding, said reinforcement means (11) further including a fibrous reinforcement layer (24) in said hose (2) between at least one outer protective layer (25) and at least one inner layer (26) designed to contact the fluid to be carried, wherein said outer wall (7) of said tubular projection (4) is inwardly tapered for easier connection with the inner surface (8) of said end portion (9) of said hose (2), and said inner face (14) of said annular member (12) is outwardly tapered for easier connection with said outer surface (15) of said end portion (9) of said hose (2), wherein said annular member (12) is coaxial with said central tubular projection (4) and radially spaced therefrom to define an interspace (16) having a bottom wall (17) and an opening (18), designed to receive said end portion (9) of said hose (2), wherein said end portion (9) of said hose (2) is at least partly integrally coupled to the bottom wall (17) of said interspace (16), wherein the bottom wall of said interspace and the inner face of said annular member are smooth and free of projections and recesses, wherein a ratio between length of said annular member and length of said central tubular projection is between 1:1 to 4:1, and wherein said second polymer material and said third polymer material are stiffer than said first polymer material so that, upon fixing, the flexible hose melts to cause the outer wall of said central tubular projection to be at least partly integrally coupled to the inner surface of said end portion of said flexible hose and the end portion of said hose to be at least partly integrally coupled to the bottom wall of said interspace, and said outer surface of said end portion of said hose to be at least partly integrally coupled to said inner face of said annular member.

* * * * *